June 24, 1930.  J. B. WALLACE  1,766,570
BALE PRESS
Filed June 27, 1927  2 Sheets-Sheet 2
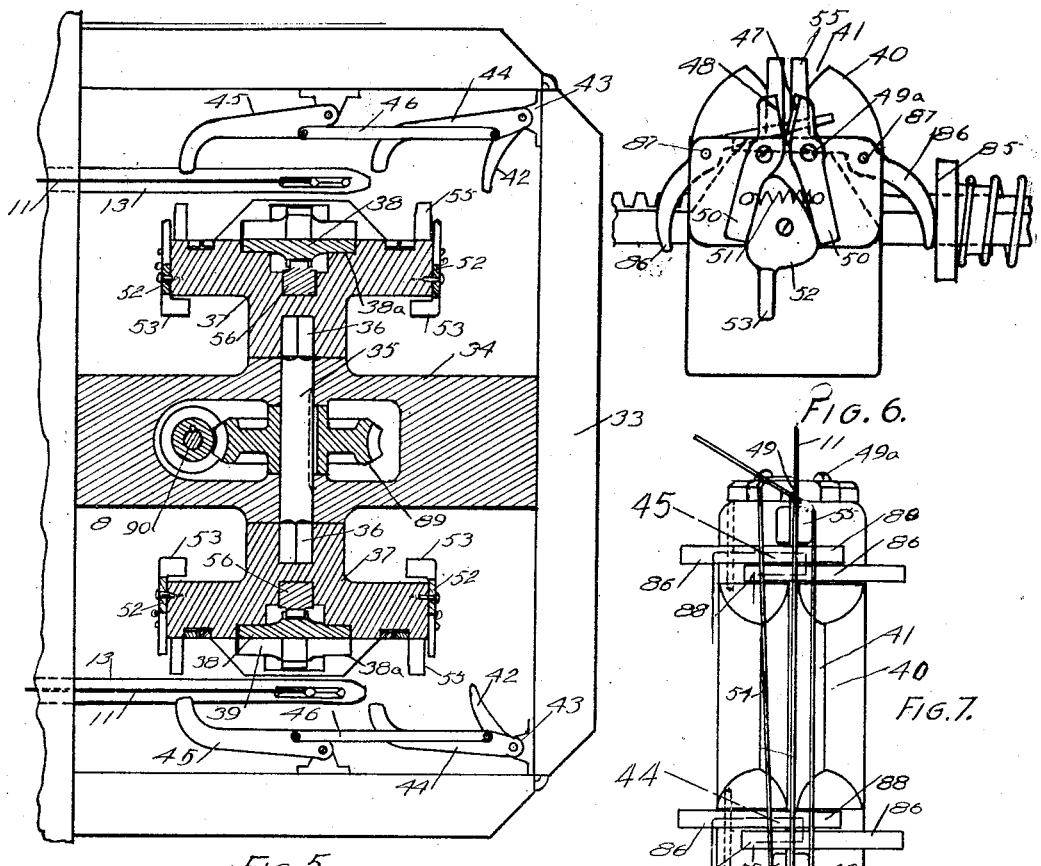
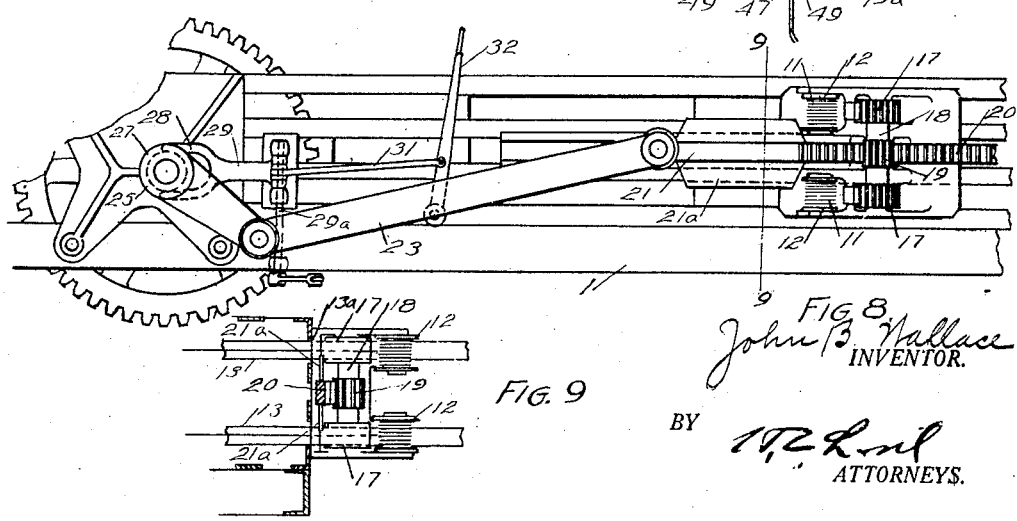

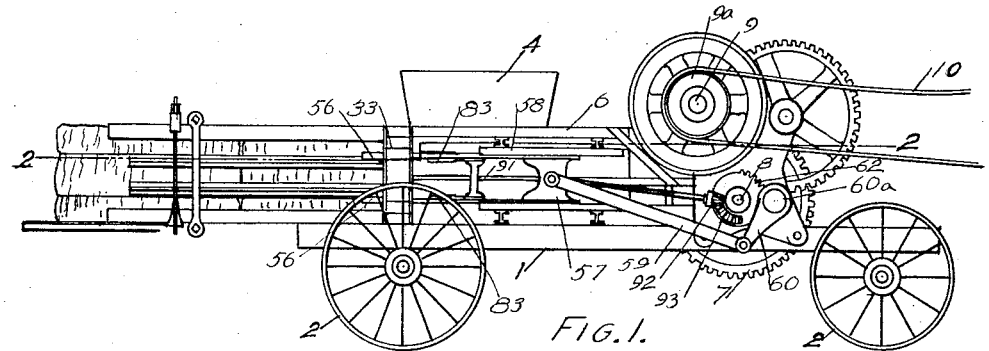
June 24, 1930.  J. B. WALLACE  1,766,570
BALE PRESS
Filed June 27, 1927   2 Sheets-Sheet 1
John B. Wallace
INVENTOR.
BY
W. G. Lord
ATTORNEYS.

Patented June 24, 1930

1,766,570

UNITED STATES PATENT OFFICE

JOHN B. WALLACE, OF GROVE CITY, PENNSYLVANIA

BALE PRESS

Application filed June 27, 1927. Serial No. 201,895.

In the present invention a bale press is provided with controlling means by which the tying mechanism may be thrown into operation by the operator at any desired length of bale and the wire handling and tying is actuated through the power mechanism. The device also involves an improvement in the wire handling and tying in that the tie is formed by overlapped ends extending in opposing directions twisted together thus making the tie with slight extending parts and with economy of wire. The invention involves also a simplification of mechanism for accomplishing the handling and twisting of the wire through the power mechanism of the machine. Details and features of the invention will appear from the specification and claims.

The invention is illustrated in the accompanying drawings as follows:—

Fig. 1 shows a side elevation of the press.
Fig. 2 a plan view slightly enlarged.
Fig. 3 a view of the tying mechanism in section on the line 3—3 in Fig. 2.
Fig. 4 a view of a mutilated gear involving the tying mechanism.
Fig. 5 a section of the tying mechanism on the line 5—5 in Fig. 3.
Fig. 6 an enlarged detail of a part of the tying mechanism.
Fig. 7 a plan view of the tying head.
Fig. 8 a side elevation of a part of the press showing the wire feeding finger actuating mechanism.
Fig. 9 a section on the line 9—9 in Fig. 8.

1 marks the frame of the machine. This is mounted on wheels 2 in the usual manner, and 3 a compression chamber formed of longitudinal slats in the usual manner and a hopper 4 leads to the compression chamber. A plunger 5 operates in guides 6 and is actuated by a pitman $6^a$ operating on a crank between gears 7. The gears are carried by shafts 8 journaled in journals $8^a$ on the frame. The gears 7 are driven through suitable gearing from a power shaft 9 which is driven through a driving pulley $9^a$ from a driving power belt 10.

Wires 11 are fed from spools 12, there being preferably two of these with a similar mechanism operating the wires. The wires are threaded through needles 13 and the needles reciprocate in guide blocks $13^a$ at the side of the press frame. The tie end 14 of the wire feeds over a small guide roll 15 in the side of the frame and runs into the tying mechanism. The needles are provided with racks 16 at one side which mesh with gears 17. The gears 17 are mounted on shafts 18 journaled in the guide blocks $13^a$ and a gear 19 is secured at the center of the shaft. A rack 20 operates on the gear 19. The rack 20 is provided with an extension 21 which is provided with a head 22. A link 23 extends from the head 22 to a crank 24. The crank 24 is provided with a hub 25 which is journaled on the shaft 8. It has a clutch face 26 adapted to engage a clutch block 27 splined on the shaft. The clutch block 27 is operated by a fork 28 carried by a lever 29. The lever 29 is mounted on a rod $29^a$ carried by the frame. An arm 30 extends from the rod. A link 31 connects the arm 30 with a hand lever 32 by means of which the operator may throw the clutch 27 into engagement with the clutch face 26. A projection $28^a$ is arranged on the arm 30 in the path of a spring $24^a$ on the crank 24. This spring can be readily overcome by the operator in forcing the clutch into engagement but upon the completion of the rotation of the crank the spring engaging the projection $28^a$ throws the clutch out of engagement at the completion of the cycle.

As the crank operates it feeds the needle through the bale carrying with it the loop of wire.

A tying mechanism is arranged in a housing 33 into which the needle is fed. This housing is supported on the frame of the compression chamber. It has a central web 34 in which is arranged a vertical rotating post 35. This post is provided with squared ends 36 on which tying heads 37 are mounted, one head at the top operating with the upper needle and the other head at the bottom operating with the lower needle. These heads are provided with twisting gears 38 which are rotatively mounted in the head with trunnions $38^a$. The gears are provided with twisting slots 39 which at the center are of sufficient width to receive the overlapped wires, one above the other, and thus twist the wire from this central portion outwardly when the gear is twisted in the well-known manner. A guide mounting 40 is arranged over the gear and this has the flaring guide slot 41 which leads the wire into the slot in the gear, this housing also assisting in holding the gear in place. The needles as they advance engage arms 42 mounted on hangers 43 on the housing. The arms 42 are rigidly connected with swinging arms 44. The arms 44 are connected with swinging arms 45 by links 46. As the needles advance they engage the arms 42, swinging the arms 42 downwardly and these engaging the leading-in end of the wire depress the same into the twisting slot. A tying head 37 is mounted at each side of a severing and clamping device. This comprises cutting off blades 47 and 48, these blades being formed integrally with clamping jaws 49. The clamping jaws are pivotally mounted on screws 49ᵃ on the head and have extending arms 50. Springs 51 tend to open the jaws. A cam 52 operates between the arms 50 and when forcing the arms apart so as to close the clamping jaws is locked in this position by the frictional engagement of the arms. The cams have the operating extensions 53. The bale end of the wire is carried through the frame and is formed with a return loop, the return end of this loop being carried into the twisting slot of the gear. This loop is carried by the loop posts 55 which are arranged immediately inside of but slightly spaced from the clamping jaws 49 so that the loop 54 may be passed downwardly, or upwardly as the case may be on the loop post 55 behind the arms 49. As the arms 44 are depressed the leading in wire is pressed down into the slot in the gear and between the clamping fingers 49, this pressing down carrying the return end of the loop 54 with it into the extreme position in the slot in the gear. A rack 56 is fed forward into mesh with the gear. This rack is actuated by a cross head 57 which cross head operates in guides 58 at the side of the frame. The cross head is actuated through a pitman 59 from a crank 60. The crank 60 is mounted on a shaft 60ᵃ and has a gear 61 on its hub. The gear 61 meshes with a mutilated gear 62. The mutilated gear has clutch jaws 63 on its face adapted to be engaged by the jaw teeth of a clutch block 64. The clutch block 64 is actuated by a fork 65 carried by a lever 66. The lever 66 is pivotally mounted on a pin 67 at the side of the frame and the outer end of the lever is connected by a link 68 with an arm 69. The arm 69 is mounted on the shaft 29ᵃ so that as the clutch block 27 is thrown into engagement the clutch block 63 is also thrown into engagement. The mutilated gear with its initial movement passes along a dwell space 79. During this period the needle, through the action of the crank 24, is moved through the compression chamber and into contact with the arm 42 forcing the leading-in wire into the twisting slot and with it the return end of the loop. As this is accomplished the tooth portion 80 of the mutilated gear engages the gear 61 and moves the racks 56 forward rotating the twisting gears and tying the leading-in wire 11 with the return loop 54. As the racks advance they carry with them formed push fingers 83. These push fingers are adapted to engage the operating fingers 53 of the clamping arms 49 at the opposite sides of the head 37, the clamping arms at the outside of the head being closed to clamp and sever the leading-in wire and the arms at the press side of the rotating head being opened in order to release the end of the loop 54. At the same time spring actuated shoulders 85 are carried forward with the racks and these engage arms 86 which are mounted on pins 87 on the head, the arms 86 having inwardly extending knock-out fingers 88 which, upon the opening of the arms 49, force, under the action of the spring-actuated shoulder, the twisted wire upwardly out of the slot in the gear, thus releasing the tied wire. The part 80 of the mutilated gear returns the racks 56 to their initial position. During the period that the gear 80 is operating the needles are locked in their inner position. This is accomplished by providing the rack 20 with idling extensions 21 and the head 22 with locking plates 21ᵃ which enter grooves 13ᵃ in the needles. Thus the needles are held in their inner position during the time that the twisting is taking place. By the time that the twisting of the wire is completed these locking plates have receded and the rack again engages the needle for the return movement.

After the needles are partially retracted the heads 56 are rotated. This is accomplished by providing the shaft 35 with a worm gear 89. The gear 89 is actuated by a worm 90 carried by a shaft 91. The shaft 91 is provided with a beveled gear 92 which operates on the mutilated beveled gear 93 on the face of the mutilated gear 62. This mutilated gear 93 accomplishes a rotation of the head after the twisting action is practically completed and after the needle is partially withdrawn. It will be noted that prior to the turning movement of the head the clamping jaws 49 have been closed, as above described, and the leading-in wire severed and that the clamps at the press side holding the end of the loop 54 have been severed so that the wire at each end of the twisted tie has been severed and the leading-in wire clamped with the head. It will also be noted that at the completion of the twisting movement and before this turning of the head the knock-out fingers 88 have operated, lifting the twisted-in portion of the tie out of the slot and at the same time the end of the loop 54 off the post 55 so that the wire surrounding the bail is released. The spring of the material in the bale straightens out the wire that formed the loop and takes up this slack so that in the finished bale there is a tie of single wires, the ends of the wires extending in opposite directions and the severed ends of each wire being at the end of the tie remote from the entrance of said wire to the tie. The mutilated gear 62 has a portion 82 supplementing the portion 81 which gives a dwell to the gear 61 during this rotating movement.

As the head is rotated, the end of the wire leading from the bale is carried by its clamp and with the rotation an intermediate portion of this wire is picked up by the post 55 and at the completion of the rotation of a half turn a new loop 54 is formed, this wire assuming the position shown in Fig. 7 except that at this moment of the operation the leading-in wire 11 will not yet be in place, as shown in that figure.

The sequence of events, therefore, as to the twisting operation, is as follows: Starting with the return loop as shown in Fig. 7 upon the completion of the bale the needle is advanced bringing the leading wire into place over the twisting slot. As the needle engages the finger 42 the swinging arms 44 and 45 engage the leading-in wire and the return end of the loop 54, this return end being at the left of Fig. 7 (the part of this loop leading back to the bale is not engaged by the arms 44 and 45). As soon as the wires 11 and the return end 54 reach the bottom of the twisting slot in the twisting gear the rack 56 is advanced rotating the gear and forming the tie twist between the leading-in wire and the return end of the loop 54. Immediately upon the completion of the twisting movement, or at least after it has progressed sufficiently to tie the leading-in wire the clamps 49 are closed and the leading-in wire severed inside the clamps so that the free end of the leading-in wire is engaged by the clamps 49 away from the press. The needle is then retracted and a wire leads from the clamp 49 back with the needle in front of the incoming bale. At the same time, the severed leading-in wire and the loop 54 are lifted out of the twisting slot and off the post 55 releasing the wire tied around the bale. Immediately the spring of the bale straightens out the loop and takes up the slack. As soon as this is completed the head is given a half rotation. The clamped end of the engaged wire which at this moment is connected with the needle is turned a half revolution and the post 55 picks up an intermediate portion of this wire so that at the completion of the half turn a new loop 54 is formed, the wire then being in the position shown in Fig. 7 except that the new leading-in wire 11 has not reached the position there shown. The bale is then completed, the needle again advanced and this cycle repeated.

From this description it will be seen that a bale of any size may be made. The operator may, at any time, throw the tying mechanism into action and close the wire around the bale and form a tie. When the mechanism is thrown into action the tie is formed and the mechanism locked out. By forming the return loop the tie is made with the overlapping ends of the wire, these overlapping ends extending in opposite directions so that there is no outwardly projecting ends of the wire.

What I claim as new is:—

1. In a bale press, the combination of a press chamber; a reciprocating plunger; power means actuating the plunger; wire operating mechanism comprising devices forming a return loop of the bale end of the wire; means bringing the single return end of the loop and the leading in wire into overlapping position; and means twisting the overlapping portions.

2. In a bale press, the combination of a press chamber; a reciprocating plunger; power means actuating the plunger; wire operating mechanism comprising a wire carrying needle on which the leading in wire is threaded; a slotted twisting member; the slot thereof extending crosswise of the machine and means actuated by the needle deflecting the leading in wire into the slot of the twisting member.

3. In a bale press, the combination of a press chamber; a reciprocating plunger; power means actuating the plunger; wire operating mechanism comprising a wire carrying needle on which the leading in wire is threaded; a slotted twisting member; the slot thereof extending crosswise of the machine means actuated by the needle deflecting the leading in wire into the slot of the twisting member; a severing and gripping mechanism severing and gripping the leading in wire; and knock-out devices knocking out the tied wire from the slot of the twisting member.

4. In a bale press, the combination of a press chamber; a reciprocating plunger; power means actuating the plunger; a wire operating mechanism comprising a rotating head having severing and clamping mechanisms at opposite sides; a twisting mechanism; a wire carrying needle; means on the head forming a return loop as the head is rotated with the return end of the loop in the twisting mechanism; means for deflecting the wire from the needle into the twisting mechanism; and devices severing and clamping the leading in wire.

5. In a bale press, the combination of a press chamber; a reciprocating plunger; power means actuating the plunger; a wire operating mechanism comprising a rotating head on which there is a twisting member, severing members at opposite sides, clamping members at opposite sides, knock-out members at opposite sides; and reciprocating means actuating the severing and clamping mechanisms, the knock-out devices and rotating head in sequence.

6. In a bale press, the combination of a press chamber; a reciprocating plunger; power means actuating the plunger; a wire operating mechanism comprising a rotating head on which there is a twisting member, severing members at opposite sides, clamping members at opposite sides, knock-out members at opposite sides; reciprocating means actuating the severing and clamping mechanisms, the knock-out devices and rotating the head in sequence; a needle operating in connection with the head; means for deflecting the wire from the needle into the twisting device; and clamping means in advance of the rotation of the head.

7. In a bale press, the combination of a press chamber; a reciprocating plunger; power means actuating the plunger; wire operating mechanism comprising upper and lower heads oppositely faced; two needles one operating in connection with each head, each head comprising means forming a return loop and having a twisting member; devices deflecting the wire from the needle in the twisting member, each head having means for severing and clamping the leading in wire; and means for rotating the head.

8. In a bale press, the combination of a press chamber; a reciprocating plunger; power means actuating the plunger; wire operating mechanism comprising upper and lower heads oppositely faced; two needles, one operating in connection with each head, each head comprising means forming a return loop and having a twisting member; devices deflecting the wire from the needle in the twisting member, each head having means for severing and clamping the leading in wire and means for knocking out the tied wire; and means for rotating the head.

9. In a bale press, the combination of a press chamber; a reciprocating plunger; power means actuating the plunger; and wire operating mechanism comprising a rotating head having a twisting mechanism, a clamping and severing mechanism at each side of the head comprising projecting arms, cams between said arms, operating projections on the cams, said cams being adapted to remain in locked position when moved to locked position, or unlocked postion when released; a reciprocating device operating on said cam projections to lock one gripping mechanism and release the other simultaneously; and means actuating the twisting device.

10. In a bale press, the combination of a press chamber; a reciprocating plunger; power means actuating the plunger; wire operating and tying mechanism driven by the power means comprising a wire carrying needle moving transversely across the chamber and extending transversely therefrom; devices leading the wire ends in opposite directions transversely of the chamber into overlapping position; and means twisting the overlapping ends.

In testimony whereof I have hereunto set my hand.

JOHN B. WALLACE.